US012645167B2

(12) United States Patent
Mizutani et al.

(10) Patent No.: US 12,645,167 B2
(45) Date of Patent: Jun. 2, 2026

(54) LASER SCANNING UNIT, IMAGE FORMING APPARATUS, AND ONE AND TWO-POINT SUPPORTS FOR MIRRORS AND LENSES

(71) Applicant: KYOCERA Document Solutions Inc., Osaka (JP)

(72) Inventors: Hideji Mizutani, Osaka (JP); Shingo Yoshida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 189 days.

(21) Appl. No.: 18/667,237

(22) Filed: May 17, 2024

(65) Prior Publication Data

US 2024/0385551 A1 Nov. 21, 2024

(30) Foreign Application Priority Data

May 19, 2023 (JP) .................................. 2023-082681

(51) Int. Cl.
| | |
|---|---|
| *G02B 7/02* | (2021.01) |
| *B41J 2/47* | (2006.01) |
| *G02B 26/10* | (2006.01) |
| *G03G 15/01* | (2006.01) |
| *G03G 15/04* | (2006.01) |
| *G03G 15/043* | (2006.01) |

(52) U.S. Cl.
CPC .......... *G03G 15/0435* (2013.01); *B41J 2/473* (2013.01); *G02B 26/105* (2013.01); *G03G 15/011* (2013.01); *G03G 15/0189* (2013.01); *G03G 15/04036* (2013.01)

(58) Field of Classification Search
None
See application file for complete search history.

(56) References Cited

U.S. PATENT DOCUMENTS

| | | | | |
|---|---|---|---|---|
| 2006/0126148 A1* | 6/2006 | Ushio | .................. | G02B 26/105 |
| | | | | 359/212.1 |
| 2009/0324292 A1* | 12/2009 | Oda | ........................ | G02B 7/022 |
| | | | | 399/206 |
| 2010/0103455 A1* | 4/2010 | Morikawa | ............ | H04N 1/0303 |
| | | | | 358/475 |
| 2018/0101003 A1* | 4/2018 | Ogura | .................. | G02B 26/105 |
| 2019/0163088 A1 | 5/2019 | Taniyama et al. | | |

FOREIGN PATENT DOCUMENTS

JP 2019101160 A 6/2019

* cited by examiner

*Primary Examiner* — Stephen D Meier
*Assistant Examiner* — Samuel Frederick Boelitz
(74) *Attorney, Agent, or Firm* — Alleman Hall LLP

(57) ABSTRACT

A plurality of two-point mirror support portions each support two positions of a mirror specific surface at an end portion of each of a plurality of mirrors on a first side of a first direction. A plurality of one-point mirror support portions each support one position of the mirror specific surface or an end surface at an end portion of each of the plurality of mirrors on a second side of the first direction. A plurality of two-point lens support portions each support two positions of a lens specific surface of each of a plurality of lenses at an end portion on the second side of the first direction. A plurality of one-point lens support portions each support one position of the lens specific surface of each of the plurality of lenses at an end portion on the first side of the first direction.

7 Claims, 5 Drawing Sheets

LASER SCANNING UNIT, IMAGE FORMING APPARATUS, AND ONE AND TWO-POINT SUPPORTS FOR MIRRORS AND LENSES

INCORPORATION BY REFERENCE

This application is based upon and claims the benefit of priority from the corresponding Japanese Patent Application No. 2023-082681 filed on May 19, 2023, the entire contents of which are incorporated herein by reference.

BACKGROUND

The present disclosure relates to a laser scanning unit including a plurality of mirrors and a plurality of lenses, and an image forming apparatus.

A color image forming apparatus that uses electrophotography includes a plurality of photoconductors and a laser scanning unit. The laser scanning unit scans a plurality of laser light beams onto surfaces of the plurality of photoconductors. Thus, the laser scanning unit writes electrostatic latent images on the respective surfaces of the plurality of photoconductors.

The laser scanning unit includes a housing, a plurality of mirrors, and a plurality of lenses. The plurality of mirrors and the plurality of lenses are arranged inside the housing while a scanning direction of the plurality of laser light beams is set as a longitudinal direction.

An arrangement accuracy of the plurality of mirrors and the plurality of lenses largely affects an accuracy in writing the electrostatic latent images.

For example, it is known that the plurality of mirrors and the plurality of lenses are each supported by the housing at three positions.

In the case described above, a first end portion of each of the plurality of mirrors in the longitudinal direction is supported at two positions, and a second end portion of each of the plurality of mirrors in the longitudinal direction is supported at one position. Similarly, a first end portion of each of the plurality of lenses in the longitudinal direction is supported at two positions, and a second end portion of each of the plurality of lenses in the longitudinal direction is supported at one position.

SUMMARY

A laser scanning unit according to an aspect of the present disclosure includes a housing, a laser scanner, a plurality of mirrors, a plurality of lenses, a plurality of mirror fastening members, and a plurality of lens fastening members. The laser scanner is arranged inside the housing and scans a plurality of laser light beams along a first direction. The plurality of mirrors are arranged inside the housing along the first direction and respectively reflect the plurality of laser light beams. The plurality of lenses are arranged inside the housing along the first direction. The plurality of laser light beams respectively pass through the plurality of lenses. The plurality of mirror fastening members respectively fasten both end portions of the plurality of mirrors in the first direction to a plurality of mirror support portions that are each a part of the housing. The plurality of lens fastening members respectively fasten both end portions of the plurality of lenses in the first direction to a plurality of lens support portions that are each a part of the housing. The plurality of mirrors and the plurality of lenses are arranged alternately with intervals in a second direction intersecting with the first direction. The plurality of mirror support portions include a plurality of two-point mirror support portions and a plurality of one-point mirror support portions. The plurality of two-point mirror support portions each support two positions of a mirror specific surface that is a reflection surface or a back surface opposite to the reflection surface at an end portion of each of the plurality of mirrors on a first side of the first direction. The plurality of one-point mirror support portions each support one position of the mirror specific surface or an end surface at an end portion of each of the plurality of mirrors on a second side of the first direction. The plurality of lens support portions include a plurality of two-point lens support portions and a plurality of one-point lens support portions. The plurality of two-point lens support portions each support two positions of a lens specific surface that is a light incidence surface or a light-emitting surface of the plurality of laser light beams at an end portion of each of the plurality of lenses on the second side of the first direction. The plurality of one-point lens support portions each support one position of the lens specific surface of each of the plurality of lenses at an end portion on the first side of the first direction.

An image forming apparatus according to another aspect of the present disclosure includes a plurality of photoconductors, the laser scanning unit, a plurality of developing devices, and a transfer device. The laser scanning unit scans a plurality of laser light beams onto surfaces of the plurality of photoconductors to write a plurality of electrostatic latent images on the surfaces of the plurality of photoconductors. The plurality of developing devices develop the plurality of electrostatic latent images into a plurality of toner images. The transfer device transfers the plurality of toner images from the plurality of photoconductors onto a sheet.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings. It is noted that the following embodiment is an example of embodying the present disclosure and does not limit the technical scope of the present disclosure.

Figure 1:
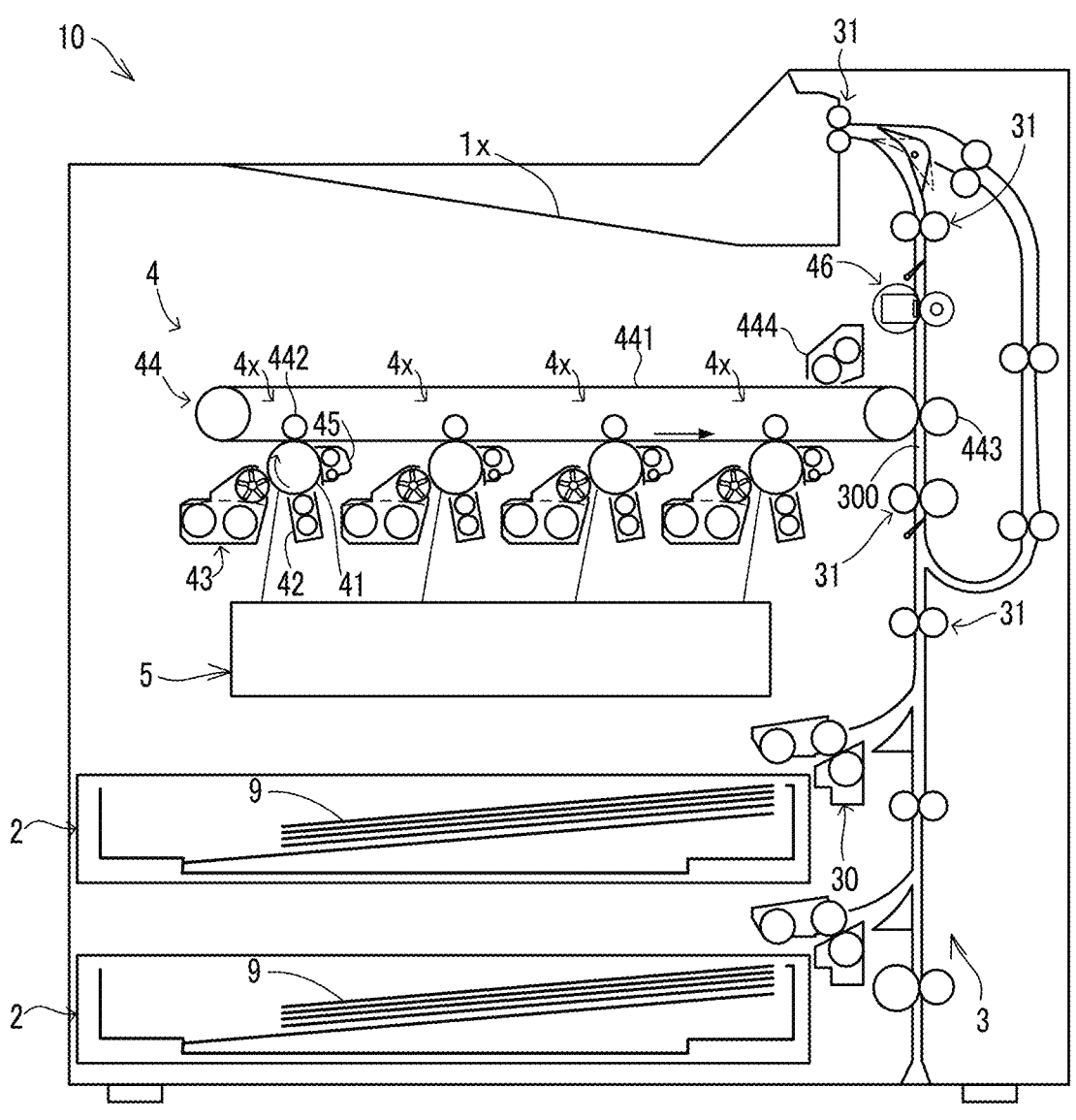
FIG. 1 is a configuration diagram of an image forming apparatus including a laser scanning unit according to an embodiment.

A laser scanning unit 5 according to the embodiment configures a part of an image forming apparatus 10 that uses electrophotography (see FIG. 1).

[Configuration of image forming apparatus 10] As shown in FIG. 1, the image forming apparatus 10 includes a sheet conveying device 3 and a printing device 4. The image forming apparatus 10 is a tandem-type color image forming apparatus.

The sheet conveying device 3 includes a sheet feed mechanism 30 and a plurality of conveying roller pairs 31. The sheet feed mechanism 30 feeds sheets 9 stored in a sheet storing portion 2 to a conveying path 300. The conveying path 300 is a path for conveying the sheet 9.

The plurality of conveying roller pairs 31 are rotationally driven by a motor (not shown). The plurality of conveying roller pairs 31 rotate to convey the sheet 9 along the conveying path 300 and further discharge the sheet 9 onto a discharge tray 1x.

A printing device 4 executes printing processing using electrophotography. The printing processing is processing of forming an image on the sheet 9. The sheet 9 is an image forming medium such as a paper sheet or a sheet-type resin member.

The printing device 4 includes a plurality of image forming portions 4x respectively corresponding to a plurality of toner colors. The printing device 4 further includes a laser scanning unit 5, a transfer device 44, and a fixing device 46.

Each of the image forming portions 4x includes a drum-type photoconductor 41, a charging device 42, a developing device 43, a drum cleaning device 45, and the like. In other words, the printing device 4 includes a plurality of photoconductors 41, a plurality of developing devices 43, and a plurality of drum cleaning devices 45 respectively corresponding to the plurality of toner colors.

In each of the image forming portions 4x, the photoconductor 41 rotates so that the charging device 42 charges a surface of the photoconductor 41. The laser scanning unit 5 scans a plurality of laser light beams onto the respective charged surfaces of the plurality of photoconductors 41. Thus, the laser scanning unit 5 writes an electrostatic latent image on the surface of each of the plurality of photoconductors 41.

The plurality of developing devices 43 respectively supply toner to the surfaces of the plurality of photoconductors 41 to thus develop the electrostatic latent images into toner images. The toner is granular developer. The photoconductor 41 is an example of an image-carrying member which rotates while carrying the toner image.

In the present embodiment, the printing device 4 includes four image forming portions 4x respectively corresponding to the toner of four development colors of yellow, cyan, magenta, and black. Accordingly, the printing device 4 includes four photoconductors 41, four developing devices 43, and four drum cleaning devices 45.

Four toner images are respectively formed on the surfaces of the four photoconductors 41. The transfer device 44 transfers the four toner images onto the sheet 9 from the four photoconductors 41.

The transfer device 44 includes an intermediate transfer belt 441, four primary transfer devices 442 respectively corresponding to the four image forming portions 4x, a secondary transfer device 443, and a belt cleaning device 444.

The four primary transfer devices 442 respectively transfer the toner images formed on the surfaces of the four photoconductors 41 onto a surface of the intermediate transfer belt 441. Thus, a color toner image obtained by combining the toner images of the four photoconductors 41 is formed on the surface of the intermediate transfer belt 441.

The secondary transfer device 443 transfers the color toner image formed on the intermediate transfer belt 441 onto the sheet 9 at a transfer position on the conveying path 300.

The fixing device 46 heats and pressurizes the color toner image transferred onto the sheet 9. Thus, the fixing device 46 fixes the color toner image onto the sheet 9.

The drum cleaning devices 45 respectively remove waste toner remaining on the surfaces of the photoconductors 41. The belt cleaning device 444 removes the waste toner remaining on the intermediate transfer belt 441.

Figure 2:
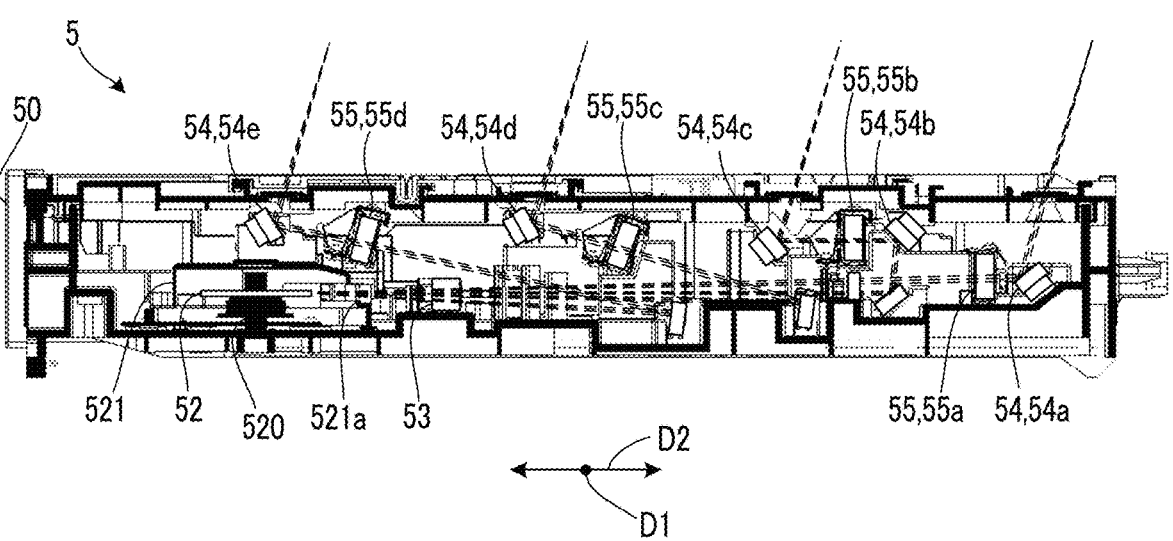
FIG. 2 is a cross-sectional view of the laser scanning unit according to the embodiment.
Figure 3:
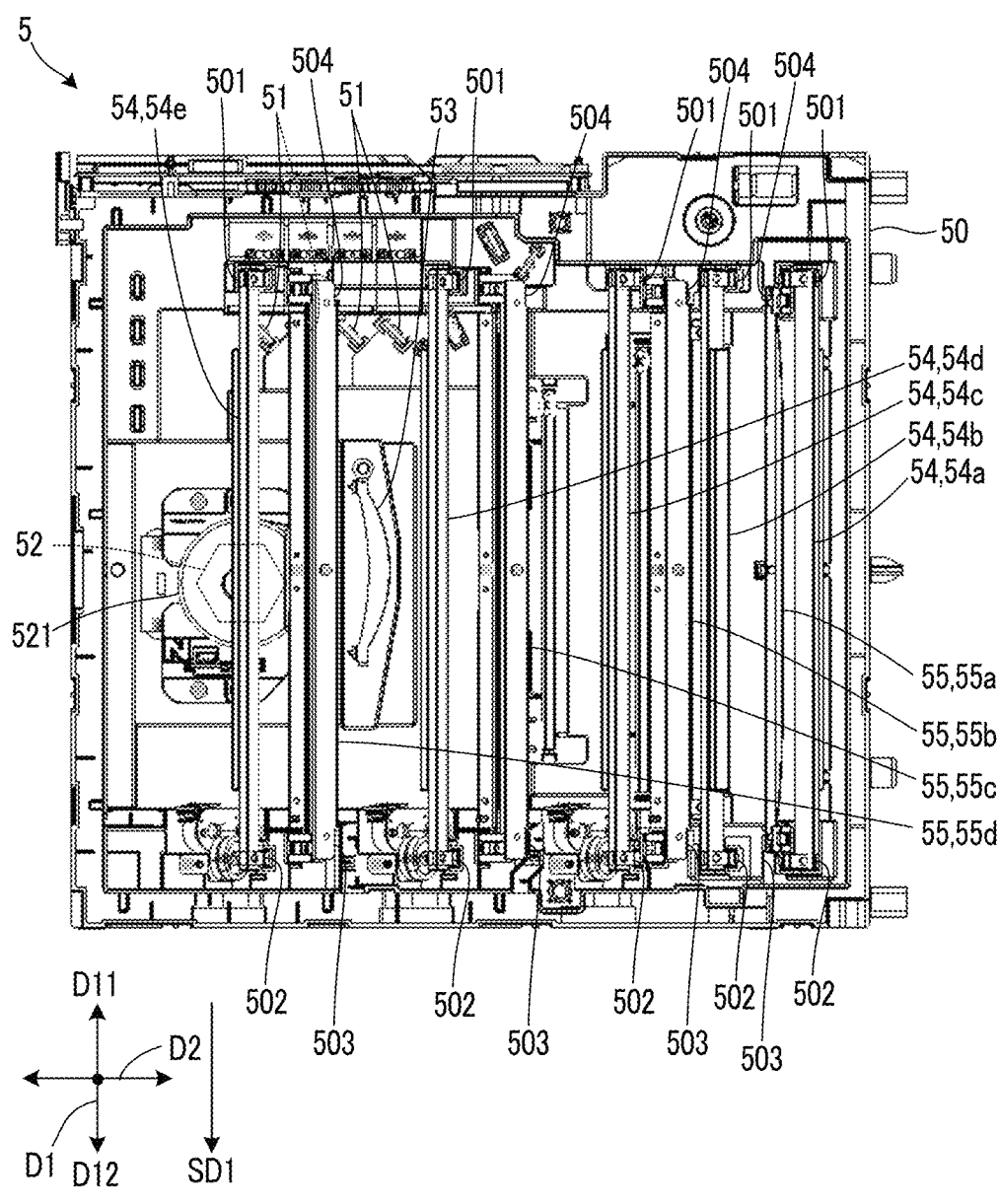
FIG. 3 is a plan view of the laser scanning unit according to the embodiment.

As shown in FIG. 2 and FIG. 3, the laser scanning unit 5 includes a housing 50, a plurality of light sources 51, a scanner 52, a main lens 53, a plurality of mirrors 54, and a plurality of sub-lenses 55. The housing 50 is a molded member formed of a synthetic resin. The plurality of light sources 51 and the scanner 52 are arranged inside the housing 50.

The plurality of light sources 51 are laser light sources that each emit laser light. The scanner 52 scans the plurality of laser light beams emitted from the plurality of light sources 51 along a first direction D1. In the example shown in FIG. 3, a scanning direction SD1 of the plurality of laser light beams is a direction directed from a first side D11 toward a second side D12 in the first direction D1.

In the present embodiment, the scanner 52 is a polygon mirror. The polygon mirror includes a plurality of mirrors arranged in a regular polygon shape in a circumferential direction. The polygon mirror rotates by being driven by a polygon motor 520 (see FIG. 2).

It is noted that a galvanometer mirror or a MEMS mirror (Micro Electro Mechanical Systems mirror) may alternatively be adopted as the scanner 52.

The laser scanning unit 5 further includes a scanner cover 521 that covers the scanner 52 (see FIG. 2 and FIG. 3). The scanner cover 521 is formed with an opening 521a through which the plurality of laser light beams pass.

The scanner cover 521 suppresses a situation where air of a high temperature, that has been heated by heat emitted from the polygon motor 520, biasedly flows to a partial region of the housing 50 by the scanner 52. Thus, bias of a temperature distribution inside the housing 50 is suppressed, and bias of a thermal expansion distribution of the housing 50 and an optical device inside the housing 50 is suppressed. As a result, deterioration of a scanning accuracy of the plurality of laser light beams due to the thermal expansion distribution is suppressed.

The main lens 53, the plurality of mirrors 54, and the plurality of sub-lenses 55 are attached inside the housing 50 while the first direction D1 is set as the longitudinal direction. In other words, the main lens 53, the plurality of mirrors 54, and the plurality of sub-lenses 55 are arranged inside the housing 50 along the first direction D1.

The plurality of mirrors 54 respectively reflect the plurality of laser light beams. The plurality of laser light beams are reflected by the plurality of mirrors 54 and pass through the main lens 53 and the plurality of sub-lenses 55.

The main lens 53 is an fθ lens common to the four development colors. In the present embodiment, the laser scanning unit 5 includes four sub-lenses 55 respectively corresponding to the four development colors.

The plurality of mirrors 54 include a first mirror 54a corresponding to black, a second mirror 54b and third mirror 54c corresponding to cyan, a fourth mirror 54d corresponding to magenta, and a fifth mirror 54e corresponding to yellow (see FIG. 2 and FIG. 3).

The main lens 53 is the fθ lens which causes all of the plurality of laser light beams that are to be irradiated onto the four photoconductors 41 to pass therethrough. The four sub-lenses 55 respectively cause some of the plurality of laser light beams irradiated onto the corresponding photoconductors 41 to pass therethrough.

The four sub-lenses 55 include a first sub-lens 55a corresponding to black, a second sub-lens 55b corresponding to cyan, a third sub-lens 55c corresponding to magenta, and a fourth sub-lens 55d corresponding to yellow (see FIG. 2 and FIG. 3).

An arrangement accuracy of the plurality of mirrors 54 and the plurality of sub-lenses 55 largely affects an accuracy in writing the four electrostatic latent images respectively corresponding to the four development colors.

Incidentally, in a manufacturing process of the laser scanning unit 5, the plurality of mirrors 54 and the plurality of sub-lenses 55 are assembled in the housing by a robot.

The plurality of mirrors 54 and the plurality of sub-lenses 55 are each supported by the housing 50 at both end portions thereof in the first direction D1.

The robot sequentially accesses the both end portions of each of the plurality of mirrors 54 and the plurality of sub-lenses 55 that are arranged in advance in the housing 50. At this time, the robot fixes to-be-supported portions of each of the plurality of mirrors 54 and the plurality of sub-lenses 55, that are provided at three positions, to the housing 50 by an attachment using fasteners or by adhesion using an adhesive.

It is desirable to efficiently perform the process of assembling the plurality of mirrors 54 and the plurality of sub-lenses 55 in the housing 50 using the robot.

In the laser scanning unit 5, a support structure for supporting the plurality of mirrors 54 and the plurality of sub-lenses 55 has a structure that enables the plurality of mirrors 54 and the plurality of sub-lenses 55 to be efficiently assembled in the housing 50 using the robot. Hereinafter, the support structure will be described.

[Support structure of plurality of mirrors 54 and plurality of sub-lenses 55] As shown in FIG. 2 and FIG. 3, the five mirrors 54 and the four sub-lenses 55 are arranged alternately with intervals in a second direction D2. The second direction D2 is a direction intersecting with the first direction D1.

Figure 4:
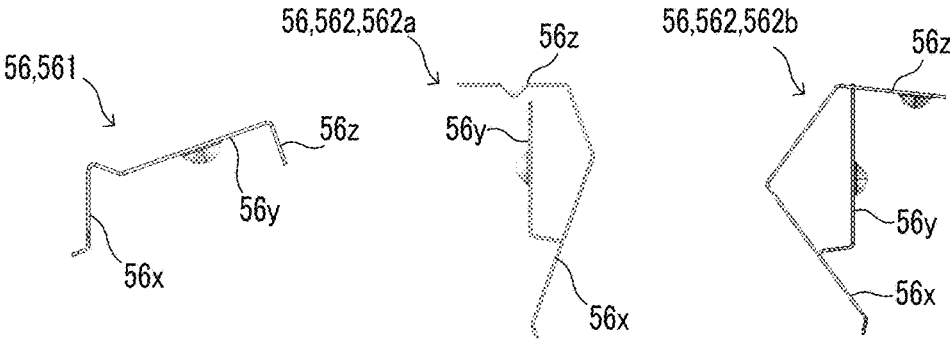
FIG. 4 is a side view of a plurality of types of fasteners provided in the laser scanning unit according to the embodiment.

The laser scanning unit 5 includes a plurality of fasteners 56 for fastening the both end portions of the plurality of mirrors 54 and the plurality of sub-lenses 55 in the first direction D1 to the housing 50 (see FIG. 4).

The plurality of fasteners 56 are tools for fastening the both end portions of the plurality of mirrors 54 and the both end portions of the plurality of sub-lenses 55 to the housing 50. In the present embodiment, the fasteners 56 are each a metal member.

The plurality of fasteners 56 each include an engagement portion 56x, a first elastic portion 56y, and a second elastic portion 56z (see FIG. 4). The engagement portion 56x is a portion that engages with the housing 50 to fix the fastener 56 to a specific part of the housing 50 (see FIG. 5 and FIG. 6).

The first elastic portion 56y and the second elastic portion 56z elastically bias the mirror 54 or the sub-lens 55 toward the housing 50. In the present embodiment, the first elastic portion 56y and the second elastic portion 56z are each a leaf spring.

The plurality of fasteners 56 include a plurality of mirror fasteners 561 and a plurality of lens fasteners 562. In the present embodiment, the plurality of mirror fasteners 561 include 10 mirror fasteners 561 corresponding to the five mirrors 54.

The plurality of lens fasteners 562 include two first lens fasteners 562a of a first shape corresponding to the first sub-lens 55a and six second lens fasteners 562b of a second shape corresponding to the second sub-lens 55b to the fourth sub-lens 55d (see FIG. 4).

The first lens fasteners 562a each fasten the first sub-lens 55a to the housing 50 in a state where the first lens fastener 562a is in direct contact with the first sub-lens 55a. Meanwhile, the second lens fasteners 562b fasten the second sub-lens 55b, the third sub-lens 55c, and the fourth sub-lens 55d to the housing 50 via lens holders (not shown). Therefore, the second lens fasteners 562b each have a shape different from that of the first lens fasteners 562a.

In the manufacturing process of the laser scanning unit 5, a robot arm attaches the plurality of mirrors 54 and the plurality of sub-lenses 55 to the housing 50. At this time, the robot arm holds the plurality of fasteners 56 and fastens the mirrors 54 and the sub-lenses 55 to the housing 50 using the respective fasteners 56. By suppressing the types of fasteners 56 as much as possible, the configuration of the robot arm is simplified.

It is noted that the lens holder is provided for adjusting a relative positional relationship between first scanning light that passes through the first sub-lens 55a and second scanning light that passes through each of the second sub-lens 55b, the third sub-lens 55c, and the fourth sub-lens 55d.

The 10 mirror fasteners 561 respectively fasten the both end portions of the five mirrors 54 in the first direction D1 to mirror support portions 501 and 502 provided at 10 positions. The mirror support portions 501 and 502 provided at 10 positions are each a part of the housing 50. The 10 mirror fasteners 561 are an example of a plurality of mirror fastening members.

The two first lens fasteners 562a fasten the both end portions of the first sub-lens 55a in the first direction D1 to the lens support portions 503 and 504 provided at two positions out of the lens support portions 503 and 504 provided at eight positions. The six second lens fasteners 562b fasten the both end portions of the second sub-lens 55b, the third sub-lens 55c, and the fourth sub-lens 55d in the first direction D1 to the lens support portions 503 and 504 provided at six positions out of the lens support portions 503 and 504 provided at eight positions.

The lens support portions 503 and 504 provided at eight positions are each a part of the housing 50. The eight lens fasteners 562 are an example of a plurality of lens fastening members.

Figure 5:
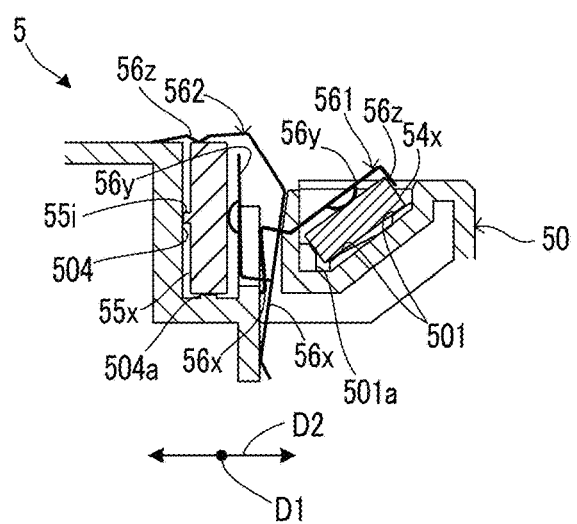
FIG. 5 is a side view of support portions at end portions of a mirror and a lens on a first side in the laser scanning unit according to the embodiment.
Figure 6:
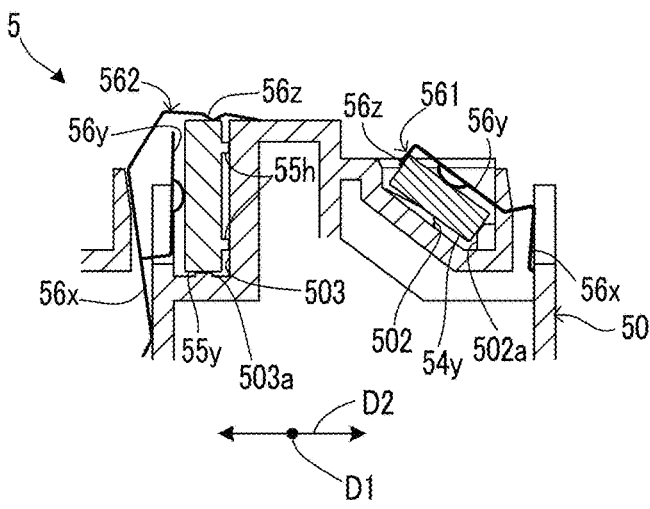
FIG. 6 is a side view of support portions at end portions of the mirror and the lens on a second side in the laser scanning unit according to the embodiment.

The mirror support portions 501 and 502 provided at 10 positions include two-point mirror support portions 501 provided at five positions and one-point mirror support portions 502 provided at five positions (see FIG. 3, FIG. 5, and FIG. 6). The first lens fasteners 562a are an example of first lens fastening members, and the second lens fasteners 562b are an example of second lens fastening members.

In FIG. 5, a first mirror end portion 54x is an end portion of each of the mirrors 54 on the first side D11 of the first direction D1. In FIG. 6, a second mirror end portion 54y is an end portion of each of the mirrors 54 on the second side D12 of the first direction D1.

The two-point mirror support portions 501 provided at five positions each support two positions of a mirror specific surface at the first mirror end portion 54x of each of the five mirrors 54 (see FIG. 3 and FIG. 5). The mirror specific surface is a reflection surface or a back surface on the other side of the reflection surface in each of the mirrors 54. The one-point mirror support portions 502 provided at five positions each support one position of the mirror specific surface at the second mirror end portion 54y of each of the five mirrors 54 (see FIG. 3 and FIG. 6).

As shown in FIG. 5, each of the two-point mirror support portions 501 is a pair of protrusion portions abutted against the mirror specific surface at the first mirror end portion 54x. The housing 50 further includes first mirror side surface support portions 501a provided at five positions, that each support a first side surface of each of the five first mirror end portions 54x.

As shown in FIG. 5, in the mirror fasteners 561 that fasten the first mirror end portions 54x, the engagement portion 56x engages with a part of the housing 50, the first elastic portion 56y elastically biases the first mirror end portion 54x toward the two-point mirror support portion 501, and the second elastic portion 56z elastically biases the first mirror end portion 54x toward the first mirror side surface support portion 501a.

As shown in FIG. 6, each of the one-point mirror support portions 502 is one protrusion portion abutted against the mirror specific surface at the second mirror end portion 54y. The housing 50 further includes second mirror side surface support portions 502a provided at five positions, that each support the first side surface of each of the five second mirror end portions 54y.

As shown in FIG. 6, in the mirror fasteners 561 that fasten the second mirror end portions 54y, the engagement portion 56x engages with a part of the housing 50, the first elastic portion 56y elastically biases the second mirror end portion 54y toward the one-point mirror support portion 502, and the second elastic portion 56z elastically biases the second mirror end portion 54y toward the second mirror side surface support portion 502a.

As described heretofore, the first elastic portions 56y of the respective mirror fasteners 561 elastically bias the mirrors 54 toward the two-point mirror support portions 501 or the one-point mirror support portions 502. The first elastic portion 56y of each of the mirror fasteners 561 is an example of a mirror bias portion.

The lens support portions 503 and 504 provided at eight positions include two-point lens support portions 503 provided at four positions and one-point lens support portions 504 provided at four positions (see FIG. 3, FIG. 5, and FIG. 6).

In FIG. 5, a first lens end portion 55x is an end portion of each of the sub-lenses 55 on the first side D11 of the first direction D1. In FIG. 6, a second lens end portion 55y is an end portion of each of sub-lenses 55 on the second side D12 of the first direction D1.

The two-point lens support portions 503 provided at four positions each support two positions of a lens specific surface at the second lens end portion 55y of each of the four sub-lenses 55 (see FIG. 3 and FIG. 6). The one-point lens support portions 504 provided at four positions each support one position of the lens specific surface at the first lens end portion 55x of each of the four sub-lenses 55 (see FIG. 3 and FIG. 5). The lens specific surface is a light incidence surface or a light-emitting surface of laser light in each of the sub-lenses 55.

In the present embodiment, each of the sub-lenses 55 includes a protrusion portion 55i protruding from the lens specific surface at the first lens end portion 55x (see FIG. 5). Each of the sub-lenses 55 further includes a pair of protrusion portions 55h protruding from the lens specific surface at the second lens end portion 55y (see FIG. 6). The pair of protrusion portions 55h are an example of a pair of first protrusion portions, and the protrusion portion 55i is an example of a second protrusion portion.

As shown in FIG. 6, each of the two-point lens support portions 503 is abutted against two positions of the lens specific surface at the second lens end portion 55y. In the present embodiment, each of the two-point lens support portions 503 is a plane that is abutted against the pair of protrusion portions 55h on the lens specific surface at the second lens end portion 55y.

The housing 50 further includes first lens side surface support portions 503a provided at four positions, that each support a first side surface of each of the four sub-lenses 55 at the second lens end portion 55y (see FIG. 6).

As shown in FIG. 6, in the lens fasteners 562 that fasten the second lens end portions 55y, the engagement portion 56x engages with a part of the housing 50, the first elastic portion 56y elastically biases the second lens end portion 55y toward the two-point lens support portion 503, and the second elastic portion 56z elastically biases the second lens end portion 55y toward the first lens side surface support portion 503a.

As shown in FIG. 5, each of the one-point lens support portions 504 is abutted against one position of the lens specific surface at the first lens end portion 55x. In the present embodiment, each of the one-point lens support portions 504 is a plane that is abutted against the protrusion portion 55i on the lens specific surface at the first lens end portion 55x.

The housing 50 further includes second lens side surface support portions 504a provided at five positions, that each support the first side surface of each of the four sub-lenses 55 at the first lens end portion 55x (see FIG. 5).

As shown in FIG. 5, in the lens fasteners 562 that fasten the first lens end portions 55x, the engagement portion 56x engages with a part of the housing 50, the first elastic portion 56y biases the first lens end portion 55x toward the one-point lens support portion 504, and the second elastic portion 56z biases the first lens end portion 55x toward the second lens side surface support portion 504a.

As described heretofore, the first elastic portions 56y of the respective lens fasteners 562 elastically bias the sub-lenses 55 toward the two-point lens support portions 503 or the one-point lens support portions 504. The first elastic portion 56y of each of the lens fasteners 562 is an example of a lens bias portion.

The both end portions of the respective mirrors 54 are attached to the housing 50 by predetermined standard procedures. In the standard procedures, the first mirror end portion 54x is fastened to the two-point mirror support portion 501 by the mirror fastener 561, and then the second mirror end portion 54y is fastened to the one-point mirror support portion 502 by the mirror fastener 561.

When the standard procedures are adopted, it is possible to attach the respective mirrors 54 to the housing 50 in a state where attitudes of the mirrors 54 are more stable than in a case where the second mirror end portion 54y is fastened to the one-point mirror support portion 502 first.

Similarly, the both end portions of the respective sub-lenses 55 are also attached to the housing 50 by the standard procedures. In the standard procedures for the respective sub-lenses 55, the second lens end portion 55$y$ is fastened to the two-point lens support portion 503 by the lens fastener 562, and then the first lens end portion 55$x$ is fastened to the one-point lens support portion 504 by the lens fastener 562.

Figure 7:
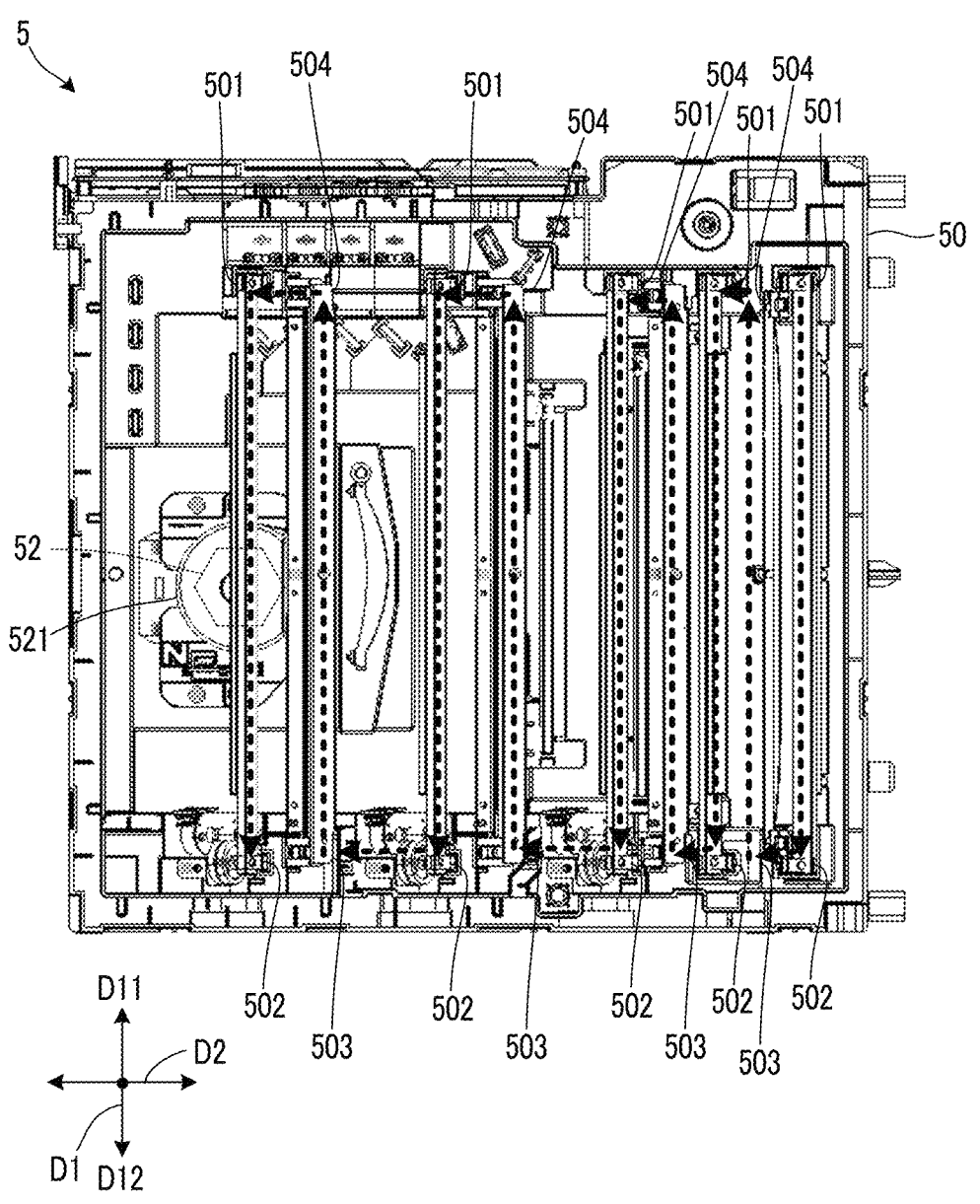
FIG. 7 is a diagram showing a movement trajectory of a robot arm in an assembly process of the laser scanning unit according to the embodiment.

In FIG. 7, arrows in broken lines indicate an example of a movement trajectory of the robot arm in the case where the five mirrors 54 and the four sub-lenses 55 are attached by the procedures described above.

The robot arm moves along a path according to the arrows in broken lines shown in FIG. 7 while holding the plurality of mirror fasteners 561 and the plurality of lens fasteners 562. Then, every time the robot arm reaches each of a plurality of attachment target portions, the robot arm attaches each of the plurality of attachment target portions to the housing 50 using the mirror fasteners 561 or the lens fasteners 562.

The plurality of attachment target portions are the both end portions of the five mirrors 54 and the both end portions of the four sub-lenses 55.

While moving according to the arrows in broken lines shown in FIG. 7, the robot arm executes processing of attaching the plurality of attachment target portions. Thus, the five mirrors 54 and the four sub-lenses 55 are attached to the housing 50 according to the standard procedures.

By adopting the laser scanning unit 5, the robot arm can fasten four attachment target portions to the housing 50 every time the robot arm reciprocates once along the first direction D1.

Meanwhile, as a reference example, the two-point mirror support portions 501 and the two-point lens support portions 503 may be arranged on the same side of the first direction D1. In this case, the robot arm can only fasten two attachment target portions to the housing 50 every time the robot arm reciprocates once along the first direction D1.

By adopting the laser scanning unit 5, the plurality of mirrors 54 and the plurality of sub-lenses 55 can be efficiently attached to the housing 50 using the robot.

Application Example

Next, an application example of the laser scanning unit 5 will be described.

In the present application example, the one-point mirror support portions 502 provided at five positions each support an end surface of each of the five mirrors 54 at the second mirror end portion 54$y$. In this case, the shape of each of the one-point mirror support portions 502 differs from that shown in FIG. 6.

In the present application example, the end surfaces of the respective five mirrors 54 at the second mirror end portions 54$y$ are bonded to the respective one-point mirror support portions 502 by an adhesive.

In the present application example, the plurality of mirror fasteners 561 that fasten the first mirror end portions 54$x$ of the five mirrors 54 to the respective two-point mirror support portions 501 are an example of a plurality of first mirror fastening members.

In the present application example, the adhesive used at the one-point mirror support portions 502 provided at five positions is an example of a plurality of second mirror fastening members that each fasten one position of the second mirror end portion 54$y$ of each of the five mirrors 54 to the one-point mirror support portion 502.

In the present application example, the robot arm moves according to the arrows in broken lines shown in FIG. 7 while holding the plurality of fasteners 56 and a tube for ejecting the adhesive. In addition, every time the robot arm reaches each of the plurality of attachment target portions, the robot arm attaches each of the plurality of attachment target portions to the housing 50 by the attachment of the fastener 56 or by the ejection of the adhesive.

The adhesive is, for example, an ultraviolet-curing adhesive. For example, ultraviolet rays are irradiated onto the reflection surfaces of the mirrors 54 so as to reach parts where the adhesive has been ejected. Also when the present application example is adopted, effects similar to those of the case where the laser scanning unit 5 is adopted can be obtained.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A laser scanning unit, comprising:

a housing;

a laser scanner which is arranged inside the housing and scans a plurality of laser light beams along a first direction;

a plurality of mirrors which are arranged inside the housing along the first direction and respectively reflect the plurality of laser light beams;

a plurality of lenses which are arranged inside the housing along the first direction and through which the plurality of laser light beams respectively pass;

a plurality of mirror fastening members which respectively fasten both end portions of the plurality of mirrors in the first direction to a plurality of mirror support portions that are each a part of the housing; and a plurality of lens fastening members which respectively fasten both end portions of the plurality of lenses in the first direction to a plurality of lens support portions that are each a part of the housing, wherein the plurality of mirrors and the plurality of lenses are arranged alternately with intervals in a second direction intersecting with the first direction, the plurality of mirror support portions include:

a plurality of two-point mirror support portions that each support two positions of a mirror specific surface that is a reflection surface or a back surface opposite to the reflection surface at an end portion of each of the plurality of mirrors on a first side of the first direction; and a plurality of one-point mirror support portions that each support one position of the mirror specific surface or an end surface at an end portion of each of the plurality of mirrors on a second side of the first direction, the plurality of lens support portions include:

a plurality of two-point lens support portions that each support two positions of a lens specific surface that is a light incidence surface or a light-emitting surface of the plurality of laser light beams at an end portion of each of the plurality of lenses on the second side of the first direction; and a plurality of one-point lens support portions that each support one position of the lens specific surface of each of the plurality of lenses at an end portion on the first side of the first direction, and the plurality of lenses are four lenses respectively corresponding to four development colors, the plurality of lens fastening members are eight lens fastening members that fasten both end portions of the four lenses, and the eight lens fastening members include two first lens fastening members of a first shape corresponding to one of the four lenses and six second lens fastening members of a second shape corresponding to remaining three of the four lenses.

2. The laser scanning unit according to claim 1, wherein the plurality of one-point mirror support portions respectively support the mirror specific surfaces of the plurality of mirrors, and the plurality of mirror fastening members respectively include mirror bias portions which elastically bias the plurality of mirrors respectively toward the plurality of two-point mirror support portions or the plurality of one-point mirror support portions.

3. The laser scanning unit according to claim 2, wherein each of the plurality of lenses incudes:

a pair of first protrusion portions protruding from the lens specific surface at the end portion on the second side of the first direction; and a second protrusion portion protruding from the lens specific surface at the end portion on the first side of the first direction, each of the plurality of two-point lens support portions is a plane abutted against the pair of first protrusion portions of each of the plurality of lenses, each of the plurality of one-point lens support portions is a plane abutted against the second protrusion portion of each of the plurality of lenses, and the plurality of lens fastening members respectively include lens bias portions which elastically bias the plurality of lenses respectively toward the plurality of two-point lens support portions or the plurality of one-point lens support portions.

4. The laser scanning unit according to claim 1, wherein the plurality of one-point mirror support portions each support the end surface of each of the plurality of mirrors, a plurality of first mirror fastening members as a part of the plurality of mirror fastening members respectively include mirror bias portions which elastically bias the plurality of mirrors respectively toward the plurality of two-point mirror support portions, and a plurality of second mirror fastening members as another part of the plurality of mirror fastening members are each an adhesive that causes the end surface of each of the plurality of mirrors to be adhered onto each of the plurality of one-point mirror support portions.

5. The laser scanning unit according to claim 4, wherein each of the plurality of lenses incudes:

a pair of first protrusion portions protruding from the lens specific surface at the end portion on the second side of the first direction; and a second protrusion portion protruding from the lens specific surface at the end portion on the first side of the first direction, each of the plurality of two-point lens support portions is a plane abutted against the pair of first protrusion portions of each of the plurality of lenses, each of the plurality of one-point lens support portions is a plane abutted against the second protrusion portion of each of the plurality of lenses, and the plurality of lens fastening members respectively include lens bias portions which elastically bias the plurality of lenses respectively toward the plurality of two-point lens support portions or the plurality of one-point lens support portions.

6. The laser scanning unit according to claim 1, further comprising:

a scanner cover which covers the laser scanner and is formed with an opening through which the plurality of laser light beams pass.

7. An image forming apparatus, comprising:

a plurality of photoconductors;

the laser scanning unit according to claim 1 which scans a plurality of laser light beams onto surfaces of the plurality of photoconductors to write a plurality of electrostatic latent images on the surfaces of the plurality of photoconductors;

a plurality of developing devices which develop the plurality of electrostatic latent images into a plurality of toner images; and a transfer device which transfers the plurality of toner images from the plurality of photoconductors onto a sheet.

* * * * *